US008674263B2

(12) United States Patent
Gelmetti et al.

(10) Patent No.: US 8,674,263 B2
(45) Date of Patent: *Mar. 18, 2014

(54) WIRE GUIDING LINER, IN PARTICULAR A WELDING WIRE LINER, WITH BIASING MEANS BETWEEN ARTICULATED GUIDING BODIES

(75) Inventors: Carlo Gelmetti, Lazise (IT); Filippo Corradini, Isera (IT)

(73) Assignee: AWDS Technologies SRL (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/382,491

(22) PCT Filed: Jul. 20, 2009

(86) PCT No.: PCT/EP2009/005246
§ 371 (c)(1),
(2), (4) Date: Jan. 5, 2012

(87) PCT Pub. No.: WO2011/009468
PCT Pub. Date: Jan. 27, 2011

(65) Prior Publication Data
US 2012/0097657 A1 Apr. 26, 2012

(51) Int. Cl.
*B23K 9/26* (2006.01)
(52) U.S. Cl.
USPC .............. 219/136; 219/137.44; 219/137.51; 219/137.52; 219/137.31; 242/615.1; 242/615.3; 226/196.1
(58) Field of Classification Search
USPC ............ 219/137.44, 137.51, 137.52, 137.31; 242/615.1, 615.3; 226/196.1
See application file for complete search history.

(56) References Cited

U.S. PATENT DOCUMENTS

| 318,062 | A | | 5/1885 | Warren |
| 532,565 | A | | 1/1895 | Kilmer |
| 617,353 | A | | 1/1899 | Redmond |
| 627,722 | A | | 6/1899 | Edwards |
| 932,808 | A | | 8/1909 | Pelton |
| 1,276,117 | A | * | 8/1918 | Riebe ............................ 464/171 |
| 1,468,994 | A | | 9/1923 | Cook ............................ 206/393 |
| 1,508,689 | A | * | 9/1924 | Glasser ................... 219/124.03 |
| 1,640,368 | A | | 8/1927 | Obetz |

(Continued)

FOREIGN PATENT DOCUMENTS

| CN | 1466469 | 1/2004 | ............. A61L 15/60 |
| CN | 1626423 | 6/2005 | |

(Continued)

OTHER PUBLICATIONS

International Search Report and Written Opinion issued in corresponding PCT Appln. No. PCT/EP2009/005246 dated Apr. 6, 2010. (9 pgs).

(Continued)

*Primary Examiner* — Dana Ross
*Assistant Examiner* — Jimmy Chou
(74) *Attorney, Agent, or Firm* — Hayes Soloway P.C.

(57) ABSTRACT

The present disclosure relates to a wire guiding liner, in particular a welding wire liner, having a plurality of guiding bodies which are pivotable with respect to each other around a defined pivot axis. At least one biasing device is provided which acts between adjacent guiding bodies so as to push them apart while still allowing the liner to bend under pressure.

19 Claims, 5 Drawing Sheets

(56) References Cited

U.S. PATENT DOCUMENTS

| | | | | |
|---|---|---|---|---|
| 1,821,354 A | 9/1931 | Meyer | | 242/159 |
| 1,907,051 A | 5/1933 | Emery | | |
| 2,027,670 A | 1/1936 | Broeren | | 312/62 |
| 2,027,674 A | 1/1936 | Broeren | | 312/60 |
| 2,059,462 A | 11/1936 | Jungmann | | |
| 2,329,369 A | 9/1943 | Haver | | 285/11 |
| 2,407,746 A | 9/1946 | Johnson | | |
| 2,457,910 A | 1/1949 | McLaren et al. | | 74/501 |
| 2,477,059 A | 7/1949 | Hill | | 242/137.1 |
| 2,483,760 A | 10/1949 | Duncan | | 254/190 |
| 2,579,131 A | 12/1951 | Tinsley | | 206/409 |
| 2,580,900 A | 1/1952 | Epstein | | 206/409 |
| 2,679,571 A * | 5/1954 | Chappel | | 219/137.44 |
| 2,694,130 A * | 11/1954 | Howard | | 219/137.44 |
| 2,713,938 A | 7/1955 | Snyder | | |
| 2,724,538 A | 11/1955 | Schweich | | |
| 2,838,922 A | 6/1958 | Gift | | 66/125 R |
| 2,849,195 A | 8/1958 | Richardson | | |
| 2,864,565 A | 12/1958 | Whearly | | 242/128 |
| 2,869,719 A | 1/1959 | Hubbard | | |
| 2,880,305 A | 3/1959 | Baird | | |
| 2,911,166 A | 11/1959 | Haugwitz | | 242/128 |
| 2,929,576 A | 3/1960 | Henning | | |
| 2,966,258 A | 12/1960 | Krafft | | |
| 2,974,850 A | 3/1961 | Mayer | | |
| 2,984,596 A | 5/1961 | Franer | | 206/412 |
| 3,022,415 A * | 2/1962 | Danhier | | 219/137.44 |
| 3,096,951 A | 7/1963 | Jenson | | 242/137.1 |
| 3,108,180 A * | 10/1963 | Linnander | | 219/137.44 |
| 3,119,042 A | 1/1964 | Bond | | |
| 3,185,185 A | 5/1965 | Pfund | | |
| 3,244,347 A | 4/1966 | Jenk | | |
| 3,274,850 A | 9/1966 | Tascio | | 74/501 |
| 3,283,121 A * | 11/1966 | Bernard et al. | | 219/137.44 |
| 3,284,608 A * | 11/1966 | McDonald | | 219/137.43 |
| 3,344,682 A * | 10/1967 | Bratz | | 74/502.3 |
| 3,352,412 A | 11/1967 | Draving et al. | | 206/59 |
| 3,433,504 A * | 3/1969 | Hanes | | 285/93 |
| 3,463,416 A | 8/1969 | Quenot | | 242/396.9 |
| 3,478,435 A | 11/1969 | Cook | | |
| 3,491,876 A | 1/1970 | Zecchin | | |
| 3,512,635 A | 5/1970 | Lang | | |
| 3,536,888 A * | 10/1970 | Borneman | | 219/137.43 |
| 3,565,129 A | 2/1971 | Field | | |
| 3,567,900 A | 3/1971 | Nelson | | |
| 3,576,966 A | 5/1971 | Sullivan | | |
| 3,595,277 A | 7/1971 | Lefever | | |
| 3,648,920 A | 3/1972 | Stump | | |
| 3,690,567 A * | 9/1972 | Borneman | | 239/591 |
| 3,724,249 A | 4/1973 | Asbeck et al. | | |
| 3,729,092 A | 4/1973 | Marcell | | |
| 3,730,136 A | 5/1973 | Okada | | 118/78 |
| 3,799,215 A | 3/1974 | Willems | | |
| 3,815,842 A | 6/1974 | Scrogin | | 242/423.1 |
| 3,823,894 A | 7/1974 | Frederick et al. | | 242/137.1 |
| 3,939,978 A | 2/1976 | Thomaswick | | 206/454 |
| 4,000,797 A * | 1/1977 | Ducanis | | 193/38 |
| 4,043,331 A | 8/1977 | Martin et al. | | 128/156 |
| 4,044,583 A | 8/1977 | Kinney, Jr. | | |
| 4,074,105 A | 2/1978 | Minehisa et al. | | |
| 4,097,004 A | 6/1978 | Reese | | 242/129 |
| 4,102,483 A | 7/1978 | Ueyama et al. | | |
| 4,113,795 A | 9/1978 | Izawa et al. | | 524/84 |
| 4,127,590 A | 11/1978 | Endo et al. | | 260/346.74 |
| 4,157,436 A | 6/1979 | Endo et al. | | 528/167 |
| 4,161,248 A | 7/1979 | Kalmanovitch | | 206/389 |
| 4,172,375 A | 10/1979 | Rushforth et al. | | |
| 4,188,526 A | 2/1980 | Asano | | |
| 4,222,535 A | 9/1980 | Hosbein | | 242/128 |
| 4,254,322 A | 3/1981 | Asano | | |
| 4,274,607 A | 6/1981 | Priest | | 242/163 |
| 4,280,951 A | 7/1981 | Saito et al. | | 524/118 |
| 4,293,103 A | 10/1981 | Tsukamoto | | |
| 4,354,487 A | 10/1982 | Oczkowski et al. | | 604/366 |
| 4,392,606 A | 7/1983 | Fremion | | 206/600 |
| 4,396,797 A | 8/1983 | Sakuragi et al. | | 174/68 |
| 4,429,001 A | 1/1984 | Kolpin et al. | | 442/340 |
| 4,451,014 A | 5/1984 | Kitt et al. | | 242/128 |
| 4,464,919 A | 8/1984 | Labbe | | |
| 4,500,315 A | 2/1985 | Pieniak et al. | | 604/379 |
| 4,540,225 A | 9/1985 | Johnson et al. | | 339/16 RC |
| 4,546,631 A | 10/1985 | Eisinger | | |
| 4,575,612 A * | 3/1986 | Prunier | | 219/137.43 |
| 4,582,198 A | 4/1986 | Ditton | | |
| 4,585,487 A | 4/1986 | Destree et al. | | |
| 4,623,063 A | 11/1986 | Balkin | | |
| 4,737,567 A | 4/1988 | Matsumoto et al. | | 528/167 |
| 4,742,088 A | 5/1988 | Kim | | 521/118 |
| 4,826,497 A | 5/1989 | Marcus et al. | | 604/359 |
| 4,855,179 A | 8/1989 | Bourland et al. | | 442/409 |
| 4,869,367 A | 9/1989 | Kawasaki et al. | | 206/409 |
| 4,891,493 A | 1/1990 | Sato et al. | | |
| 4,916,282 A * | 4/1990 | Chamming's et al. | | 219/69.2 |
| 4,918,286 A * | 4/1990 | Boyer | | 219/137.44 |
| 4,949,567 A | 8/1990 | Corbin | | |
| 4,974,789 A | 12/1990 | Milburn | | 242/159 |
| 5,051,539 A | 9/1991 | Leathers-Wiessner | | |
| 5,061,259 A | 10/1991 | Goldman et al. | | 604/368 |
| 5,078,269 A | 1/1992 | Dekko et al. | | |
| 5,100,397 A | 3/1992 | Poccia et al. | | 604/365 |
| 5,105,943 A | 4/1992 | Lesko et al. | | |
| 5,109,983 A | 5/1992 | Malone et al. | | |
| 5,147,646 A | 9/1992 | Graham | | 424/424 |
| 5,165,217 A | 11/1992 | Sobel et al. | | 242/159 |
| 5,201,419 A | 4/1993 | Hayes | | 206/409 |
| 5,205,412 A | 4/1993 | Krieg | | |
| 5,215,338 A | 6/1993 | Kimura et al. | | 285/166 |
| 5,227,314 A | 7/1993 | Brown et al. | | |
| 5,261,625 A | 11/1993 | Lanoue | | 242/129.8 |
| 5,277,314 A | 1/1994 | Cooper et al. | | 206/398 |
| 5,314,111 A | 5/1994 | Takaku et al. | | |
| 5,368,245 A | 11/1994 | Fore | | 242/171 |
| 5,372,269 A | 12/1994 | Sutton et al. | | |
| 5,452,841 A | 9/1995 | Sibata et al. | | |
| 5,485,968 A | 1/1996 | Fujioka | | 242/172 |
| 5,494,160 A | 2/1996 | Gelmetti | | 206/395 |
| 5,530,088 A | 6/1996 | Sheen et al. | | 528/287 |
| 5,553,810 A | 9/1996 | Bobeczko | | |
| 5,562,646 A | 10/1996 | Goldman et al. | | 604/368 |
| 5,585,013 A | 12/1996 | Truty | | 219/69.12 |
| 5,586,733 A | 12/1996 | Miura et al. | | 242/125.2 |
| 5,590,848 A | 1/1997 | Shore et al. | | |
| 5,629,377 A | 5/1997 | Burgert et al. | | 524/832 |
| 5,665,801 A | 9/1997 | Chang et al. | | 524/125 |
| 5,692,700 A | 12/1997 | Bobeczko | | |
| 5,714,156 A | 2/1998 | Schmidt et al. | | 424/404 |
| 5,738,209 A | 4/1998 | Burr et al. | | 206/397 |
| 5,739,704 A | 4/1998 | Clark | | |
| 5,746,380 A | 5/1998 | Chung | | |
| 5,758,834 A | 6/1998 | Dragoo et al. | | 242/128 |
| 5,778,939 A | 7/1998 | Hok-Yin | | 138/120 |
| 5,816,466 A | 10/1998 | Seufer | | |
| 5,819,934 A | 10/1998 | Cooper | | |
| 5,845,862 A | 12/1998 | Cipriani | | 242/423.1 |
| 5,847,184 A | 12/1998 | Kleiner | | 558/73 |
| 5,865,051 A | 2/1999 | Otzen et al. | | |
| 5,921,391 A | 7/1999 | Ortiz et al. | | 206/397 |
| 5,931,408 A | 8/1999 | Ishii et al. | | 242/580 |
| 5,971,308 A | 10/1999 | Boulton | | |
| 5,988,370 A | 11/1999 | Roemer et al. | | 206/215 |
| 5,990,377 A | 11/1999 | Chen et al. | | 604/381 |
| 6,016,911 A | 1/2000 | Chen | | 200/395 |
| 6,019,303 A | 2/2000 | Cooper | | |
| 6,103,358 A | 8/2000 | Bruggermann et al. | | 428/317.9 |
| 6,159,591 A | 12/2000 | Beihoffer et al. | | 428/327 |
| 6,237,768 B1 | 5/2001 | Cipriani | | |
| 6,245,880 B1 | 6/2001 | Takeuchi et al. | | 528/287 |
| 6,255,371 B1 | 7/2001 | Schlosser et al. | | 524/100 |
| 6,260,781 B1 | 7/2001 | Cooper | | |
| 6,301,944 B1 | 10/2001 | Offer | | |
| 6,322,016 B1 | 11/2001 | Jacobsson et al. | | |
| 6,340,522 B1 | 1/2002 | Burke et al. | | |
| 6,408,888 B1 * | 6/2002 | Baumer et al. | | 138/120 |
| 6,417,425 B1 | 7/2002 | Whitmore et al. | | 604/367 |

(56) References Cited

U.S. PATENT DOCUMENTS

| | | | |
|---|---|---|---|
| 6,425,549 B1 | 7/2002 | Bae et al. ................. 242/580 |
| 6,464,077 B1 | 10/2002 | Liu | |
| 6,481,892 B1* | 11/2002 | Agostini ..................... 384/43 |
| 6,498,227 B1 | 12/2002 | Horie ........................ 528/176 |
| 6,524,010 B1* | 2/2003 | Derman ..................... 384/513 |
| 6,547,176 B1 | 4/2003 | Blain et al. ............... 242/423.1 |
| 6,564,943 B2 | 5/2003 | Barton et al. ............. 206/395 |
| 6,613,848 B1 | 9/2003 | Wang et al. ............... 525/481 |
| 6,636,776 B1 | 10/2003 | Barton et al. | |
| 6,648,141 B2 | 11/2003 | Land | |
| 6,649,870 B1 | 11/2003 | Barton et al. | |
| 6,708,864 B2 | 3/2004 | Ferguson, III et al. | |
| 6,715,608 B1 | 4/2004 | Moore ........................ 206/397 |
| 6,745,899 B1 | 6/2004 | Barton | |
| 6,749,139 B2 | 6/2004 | Speck | |
| 6,750,262 B1 | 6/2004 | Hahnle et al. ............... 521/64 |
| 6,753,454 B1 | 6/2004 | Smith et al. ................ 602/41 |
| 6,821,454 B2 | 11/2004 | Visca et al. | |
| 6,831,142 B2 | 12/2004 | Mertens et al. ........... 526/328.5 |
| 6,872,275 B2 | 3/2005 | Ko et al. ................... 156/181 |
| 6,889,835 B2 | 5/2005 | Land ......................... 206/408 |
| 6,913,145 B2 | 7/2005 | Barton ....................... 206/409 |
| 6,938,767 B2 | 9/2005 | Gelmetti .................... 206/408 |
| 6,977,357 B2 | 12/2005 | Hsu et al. | |
| 7,004,318 B2 | 2/2006 | Barton ....................... 206/409 |
| 7,108,916 B2 | 9/2006 | Ehrnsperger et al. ....... 428/403 |
| 7,147,176 B2 | 12/2006 | Rexhaj | |
| 7,152,735 B2 | 12/2006 | Dragoo et al. | |
| 7,156,334 B1 | 1/2007 | Fore et al. .................. 242/171 |
| 7,178,755 B2 | 2/2007 | Hsu et al. .................. 242/423.1 |
| 7,198,152 B2 | 4/2007 | Barton et al. | |
| 7,220,942 B2 | 5/2007 | Barton et al. | |
| 7,309,038 B2 | 12/2007 | Carroscia ................... 206/409 |
| 7,377,388 B2 | 5/2008 | Hsu et al. ................... 206/389 |
| 7,410,111 B2 | 8/2008 | Carroscia | |
| 7,441,657 B2 | 10/2008 | Gelmetti .................... 206/393 |
| 7,441,721 B2 | 10/2008 | Bae et al. ................... 242/128 |
| 7,533,906 B2 | 5/2009 | Luettgen et al. .......... 285/146.1 |
| 7,563,840 B2 | 7/2009 | Ye ............................. 524/449 |
| 7,748,530 B2 | 7/2010 | Hsu et al. ................... 206/408 |
| 7,950,523 B2 | 5/2011 | Gelmetti .................... 206/408 |
| 8,207,475 B2* | 6/2012 | Minato et al. ............. 219/137.31 |
| 8,235,210 B2 | 8/2012 | De Lacerda ............... 206/393 |
| 2001/0014706 A1 | 8/2001 | Sprenger et al. .......... 523/400 |
| 2002/0000391 A1 | 1/2002 | Kawasai et al. ............ 206/408 |
| 2002/0003014 A1 | 1/2002 | Homma | |
| 2002/0014477 A1 | 2/2002 | Lee et al. | |
| 2002/0039869 A1 | 4/2002 | Achille ....................... 442/417 |
| 2002/0120178 A1 | 8/2002 | Tartaglia et al. ........... 600/114 |
| 2003/0042162 A1 | 3/2003 | Land .......................... 206/408 |
| 2003/0042163 A1 | 3/2003 | Cipriant | |
| 2003/0052030 A1 | 3/2003 | Gelmetti .................... 206/397 |
| 2003/0184086 A1* | 10/2003 | Christianson ............. 285/146.1 |
| 2004/0020041 A1 | 2/2004 | Ferguson, III et al. | |
| 2004/0050441 A1* | 3/2004 | Roschi ....................... 138/120 |
| 2004/0133176 A1 | 7/2004 | Muthiah et al. ........... 604/368 |
| 2004/0155090 A1 | 8/2004 | B.-Jensen | |
| 2004/0176557 A1 | 9/2004 | Mertens et al. ........... 526/328.5 |
| 2004/0186244 A1 | 9/2004 | Hatsuda et al. ............ 525/533 |
| 2004/0201117 A1 | 10/2004 | Anderson ................... 264/4.3 |
| 2004/0241333 A1 | 12/2004 | Cielenski et al. .......... 427/421.1 |
| 2004/0265387 A1 | 12/2004 | Hermeling et al. ........ 424/486 |
| 2005/0008776 A1 | 1/2005 | Chhabra et al. ........... 427/180 |
| 2005/0261461 A1 | 11/2005 | Maeda et al. .............. 528/272 |
| 2006/0027699 A1 | 2/2006 | Bae et al. | |
| 2006/0074154 A1 | 4/2006 | Harashina et al. ......... 524/115 |
| 2006/0155254 A1 | 7/2006 | Sanz et al. ................. 604/378 |
| 2006/0247343 A1 | 11/2006 | Kishimoto et al. ........ 524/117 |
| 2006/0258824 A1 | 11/2006 | Oshima et al. ............ 525/533 |
| 2006/0278747 A1 | 12/2006 | Carroscia | |
| 2007/0175786 A1 | 8/2007 | Nicklas | |
| 2007/0272573 A1 | 11/2007 | Gelmetti | |
| 2007/0284354 A1* | 12/2007 | Laymon .................... 219/137.51 |
| 2008/0156925 A1 | 7/2008 | Cooper ...................... 242/559.3 |
| 2008/0257875 A1* | 10/2008 | De Keizer ................. 219/137.44 |
| 2008/0300349 A1 | 12/2008 | Fuchikami et al. ........ 524/117 |
| 2008/0314876 A1* | 12/2008 | Pinsonneault et al. ...... 219/74 |
| 2009/0014572 A1 | 1/2009 | Weissbrod et al. | |
| 2009/0014579 A1 | 1/2009 | Bender et al. | |
| 2009/0200284 A1* | 8/2009 | Sanchez .................. 219/137.51 |
| 2010/0116803 A1 | 5/2010 | Gelmetti ................... 219/138 |
| 2011/0073703 A1 | 3/2011 | Gelmetti et al. .......... 242/615.2 |
| 2011/0094911 A1 | 4/2011 | Gelmetti ................... 206/408 |
| 2011/0114523 A1 | 5/2011 | Gelmetti ................... 206/407 |
| 2011/0114617 A1 | 5/2011 | Gelmetti et al. .......... 219/137.9 |
| 2011/0132880 A1 | 6/2011 | Kossowan ................ 219/76.14 |

FOREIGN PATENT DOCUMENTS

| | | | |
|---|---|---|---|
| DE | 1011840 B | 7/1957 | |
| DE | 1082215 | 11/1957 | |
| DE | 1 154 624 | 8/1960 | |
| DE | 2122958 | 11/1972 | |
| DE | 2 148 348 | 4/1973 | ............... D01F 7/04 |
| DE | 2202177 | 7/1973 | |
| DE | 2525938 | 12/1976 | ............... B23K 9/18 |
| DE | 26 46 218 | 4/1977 | ............... C07F 9/32 |
| DE | 28 16 100 | 10/1978 | ............... C08G 63/68 |
| DE | 36 09 839 | 10/1989 | ............... F16L 57/00 |
| DE | 19909214 | 3/1999 | ............... C08J 9/20 |
| DE | 19958697 | 6/1999 | ............... B01J 20/00 |
| DE | 100 06 592 | 2/2000 | ............... C08G 59/18 |
| DE | 199 10 128 | 4/2001 | ............... A61B 1/008 |
| DE | 10202839 | 1/2002 | ............... B01J 13/00 |
| DE | 103 60 466 | 7/2005 | |
| DE | 102007015946 | 10/2008 | ............... B23K 9/133 |
| EP | 2 267 255 | 4/1974 | |
| EP | 0408259 | 4/1992 | |
| EP | 0519424 A1 | 12/1992 | |
| EP | 2 264 482 | 9/1993 | |
| EP | 584056 | 2/1994 | |
| EP | 0665 166 | 1/1995 | |
| EP | 0686439 A1 | 12/1995 | |
| EP | 0806429 | 11/1997 | ............... C07F 9/655 |
| EP | 1057751 A1 | 12/2000 | |
| EP | 1 070 754 | 1/2001 | ............... C09K 21/10 |
| EP | 1 275 595 | 1/2003 | |
| EP | 1 295 813 | 3/2003 | ............... B65D 85/04 |
| EP | 1 471 024 | 10/2004 | |
| EP | 1 698 421 | 6/2006 | |
| EP | 1974846 | 10/2008 | ............... B23K 9/133 |
| EP | 2 256 064 | 1/2010 | |
| EP | 2 168 706 | 3/2010 | ............... B23K 9/133 |
| EP | 2 286 950 | 2/2011 | |
| FR | 1215111 | 4/1960 | |
| FR | 2055181 | 5/1971 | |
| FR | 2595674 | 3/1988 | |
| FR | 2888825 | 1/2007 | ............... B65H 57/14 |
| GB | 880502 | 10/1961 | |
| GB | 1168928 | 10/1969 | |
| GB | 1229913 | 4/1971 | |
| GB | 1 575 157 | 9/1980 | ............... C09K 21/12 |
| GB | 2059462 | 4/1981 | |
| GB | 2 332 451 | 6/1999 | |
| JP | 49-13065 | 2/1974 | |
| JP | 54-035842 | 3/1979 | |
| JP | 54-043856 | 4/1979 | |
| JP | 55-054295 | 4/1980 | |
| JP | 55-156694 | 12/1980 | |
| JP | 56-023376 | 3/1981 | |
| JP | 57-102471 | 6/1982 | |
| JP | 58-035068 | 3/1983 | |
| JP | 58-70384 | 5/1983 | |
| JP | 59-197386 | 11/1984 | |
| JP | 59-229287 | 12/1984 | |
| JP | 59-232669 | 12/1984 | |
| JP | 60-021181 | 2/1985 | |
| JP | 60-032281 | 2/1985 | |
| JP | 60-082275 | 5/1985 | |
| JP | 60-082276 | 5/1985 | |
| JP | 60-184422 | 9/1985 | |
| JP | 60-223664 | 11/1985 | |
| JP | 61-162541 A | 7/1986 | |
| JP | 61-293674 | 12/1986 | |

(56) References Cited

FOREIGN PATENT DOCUMENTS

| | | | |
|---|---|---|---|
| JP | 62-009774 | 1/1987 | |
| JP | 62-111872 | 5/1987 | |
| JP | 62-287055 | 12/1987 | |
| JP | 63-147781 | 6/1988 | |
| JP | 1-65265 | 4/1989 | |
| JP | 1-240222 | 9/1989 | |
| JP | 3-264169 | 11/1991 | |
| JP | 03264169 A | 11/1991 | |
| JP | 4-112169 | 4/1992 | |
| JP | 04-133973 | 5/1992 | |
| JP | 4-274875 | 9/1992 | |
| JP | 5-178538 | 7/1993 | |
| JP | 7-247058 | 9/1995 | |
| JP | 8-40642 | 2/1996 | |
| JP | 08-150492 | 6/1996 | |
| JP | 08-267274 | 10/1996 | |
| JP | 2000-202630 | 7/2000 | |
| JP | 2000-225468 | 8/2000 | |
| JP | 2000-263239 | 9/2000 | |
| JP | 2001-26375 | 1/2001 | B65H 75/16 |
| JP | 2001-150187 | 6/2001 | |
| JP | 2001-323268 A | 11/2001 | |
| JP | 2004-025242 | 1/2004 | |
| JP | 2004-025243 | 1/2004 | |
| JP | 2005-169499 | 6/2005 | |
| JP | 2007-927 | 1/2007 | |
| JP | 2007-29971 | 2/2007 | |
| KR | 2002-0077857 | 10/2002 | |
| SU | 793678 | 1/1981 | |
| SU | 1412830 | 7/1988 | |
| WO | WO 81/03319 | 11/1981 | |
| WO | WO 8810230 | 12/1988 | |
| WO | WO 94-00493 | 1/1994 | |
| WO | WO 94-19258 | 9/1994 | |
| WO | WO 97/00878 | 1/1997 | C07F 9/6571 |
| WO | WO 98/52844 | 11/1998 | |
| WO | WO 00-50197 | 8/2000 | |
| WO | WO 01/27365 | 4/2001 | D01H 4/28 |
| WO | WO 02/094493 | 11/2002 | |
| WO | WO 03-106096 A1 | 12/2003 | |
| WO | WO 2005/005704 | 1/2005 | D04H 13/02 |
| WO | WO 2005/061168 | 7/2005 | |
| WO | WO2006091075 | 8/2006 | B23K 9/133 |
| WO | WO 2007/010171 | 1/2007 | B65H 57/00 |
| WO | WO 2007/112972 | 10/2007 | B23K 9/133 |
| WO | WO 2007/149689 | 12/2007 | |
| WO | WO 2009/007845 | 1/2009 | |
| WO | WO 2009/143917 | 3/2009 | B65H 57/14 |
| WO | WO 2011/147565 | 12/2011 | B23K 9/133 |

OTHER PUBLICATIONS

Office Action issued to related U.S. Appl. No. 12/618,250, dated Apr. 26, 2012 (11 pgs).
European Office Action issued for 09777298.2, dated Aug. 31, 2012 (4 pgs).
"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Search Report, dated Mar. 2, 2011 (7 pgs).
European Search Report, dated Sep. 17, 2008.
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/IPEA/409, 7 pages.
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
PCT International Search Report, dated Nov. 6, 2008.
Plaza et al., Preparation of ethylenebis(nitrilodimethylene)tetrakis(phenylphosphinic acid), Inorganic Synthesis, vol. 16, No. 199, abstract, one page.
Search Report received in Applicant's counterpart European Patent Application Serial No. 08017572.2-2302.
Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
Ullmanns Encyclopedia of Industrial Chemistry, Sulfuric Acid & Sulfur Trioxide to Tetrahydrofuran, Superabsorbents, $6^{th}$ Edition, vol. 35, pp. 73, 80, 86 and 89 (2003.
US Official Action dated Feb. 13, 2012, issued in U.S. Appl. No. 12/917,320 (14 pgs).
US Official Action dated Dec. 14, 2012, issued in U.S. Appl. No. 12/994,686 (17 pgs).
Notice of Allowance issued in U.S. Appl. No. 12/593,271 dated Mar. 5, 2013 (15 pgs).
Notice of Allowance dated Mar. 18, 2013 issued in U.S. Appl. No. 12/994,686 (10 pgs).
Office Action issued in related U.S. Appl. No. 12/572,994, dated Apr. 24, 2013 (22 pgs).
Italian Search Report issued in related application No. MI20121423, dated Apr. 29, 2013 (2 pgs).

\* cited by examiner

WIRE GUIDING LINER, IN PARTICULAR A WELDING WIRE LINER, WITH BIASING MEANS BETWEEN ARTICULATED GUIDING BODIES

FIELD OF THE INVENTION

The invention relates to a wire guiding liner, in particular to a welding wire liner, having a plurality of guiding bodies which are pivotable with respect to each other around a defined pivot axis.

BACKGROUND OF THE INVENTION

The wire guiding liner serves for guiding a wire, in particular a welding wire. The liner can be used for guiding the wire from a wire container towards a welding robot or for guiding it within the welding robot from a feeder towards a welding torch. The purpose of the liner is to guide the wire with low friction so that the welding wire can be pushed or pulled smoothly through the liner.

SUMMARY OF THE INVENTION

The invention provides a liner which can easily be fitted with the welding wire while ensuring that the welding wire is guided smoothly. According to the invention, a wire guiding liner as defined above is characterized in that at least one biasing means is provided which acts between adjacent guiding bodies so as to push them apart. The biasing means allows to still bend the liner in order to allow him to follow the movements of e.g. a welding torch. The two functions of the biasing means are as follows: First, it eliminates the mechanical play which is present between the guiding bodies due to the defined pivot axes. Second, the biasing means tends to straighten the entire liner so that the liner seeks to assume a straight shape. The first effect of the biasing means, namely eliminating the mechanical play, suppresses an accordion effect so that the wire guiding liner always maintains its length, respective of the travelling direction of the welding wire. Without the biasing effect of the biasing means, the guiding bodies of the liner can be either pushed towards each other, resulting in a reduced length of the wire guiding liner, or can be pulled from each other, resulting in an increased length of the wire guiding liner. These changes in length which result from the mechanical play at the connection between adjacent guiding bodies, impairs the guiding precision of the wire guiding liner. The second effect of the biasing means, namely tending to straighten the wire guiding liner, facilitates the insertion of wire into the liner as the liner tends to extend either straight or, if a curve is necessary, at a comparatively large radius. A larger radius facilitates insertion of the welding wire. During operation, a larger radius helps to minimize friction.

According to a preferred embodiment of the invention, the biasing means is elastic. The elasticity of the biasing means helps to maintain the biasing effect over a long life time and a high number of bending cycles.

According to a preferred embodiment, the biasing means is a spring. A spring is a compact element which allows to provide the desired biasing effect.

The spring can be formed as a spiral spring. The spiral spring can be arranged between adjacent guiding bodies so as to reliably bias them towards a straight orientation.

According to a preferred embodiment, the biasing means is an elastomeric ring or a rubber ring. Such ring is a cheap, standardized part which exhibits the desired biasing effect while requiring only a small space.

Preferably, the biasing means is concentric with a central axis of the liner. On the one hand, this provides a symmetric biasing effect. On the other hand, a concentric biasing means allows to seal the interior opening of the wire guiding liner so that dirt cannot enter.

According to an embodiment of the invention, the spring is formed as a leaf spring. The particular advantage of a leaf spring is that it requires only small space in a longitudinal direction.

The biasing means can be formed as a separate part which is attached to the respective guiding body. This allows to choose the material for the biasing means only in view of the required biasing properties.

According to an alternative embodiment, the biasing means is formed integrally with the respective body. This eliminates the necessity to mount the biasing means after forming the guiding bodies.

The biasing means can be formed from the same material as the guiding bodies. This allows to form the guiding bodies by molding.

As an alternative, the biasing means can be formed from a material which is different from the material of the guiding bodies, the biasing means being molded to the respective guiding body. Advanced molding methods allow to integrally connect different materials in a molding process, thereby eliminating the need to separately mount the biasing means to the guiding bodies.

BRIEF DESCRIPTION OF THE DRAWINGS

The invention will now be described with reference to different embodiments which are shown in the enclosed drawings. In the drawings.

DETAILED DESCRIPTION OF THE DRAWINGS

A first embodiment of the wire guiding liner is shown in FIGS. 1 to 7. The wire guiding liner consists of a plurality of identical guiding bodies 10 which are pivotally connected to each other. Each guiding body 10 comprises two connecting lugs 12 which are arranged diametrically opposite each other.

Each connecting lug 12 comprises an opening 14. Both openings 14 of a guiding body define a pivot axis which extends in a first direction. Further, each guiding body is provided with two pivoting studs 16 which are also arranged diametrically opposite each other. The pivoting studs 16 define a second pivoting axis, the first and the second pivoting axis being oriented at an angle of 90 degrees with respect to each other. The guiding bodies 10 are connected to each other by engaging the pivoting studs 16 of a first guiding body 10 into the openings 14 of a second guiding body 10, and so on. Thereby, a wire guiding liner is formed which can have a length of several meters. The liner can be brought into a curved shape as the guiding bodies can be pivoted with respect to the adjacent guiding body.

Each guiding body contains four rolls 20 which are rotatably accommodated in the respective guiding body. The rotation axes of the rolls are arranged pairwise in parallel, with the rotation axis of two opposite rolls being perpendicular to the rotation axis of the rolls of the other pair. Between the rolls 20 and in the center of each guiding body, a wire guiding channel 22 is formed, which extends through the entire wire guiding liner.

Between adjacent guiding bodies 10, a biasing means 30 is provided. In the first embodiment, the biasing means is embodied as an O-ring 30 which is accommodated in a circular groove provided in the surface between the pivoting studs 16. In a mounted condition, the O-ring 30 is held slightly compressed between two adjacent guiding bodies, thereby tending to space the two guiding bodies from each other. This eliminates any mechanical play in the engagement between the pivoting studs 16 and the openings 14. Further, the O-ring 30 seeks to balance the compression exerted upon him by adjacent guiding bodies, thereby seeking to hold the two surfaces between which it is compressed, in a parallel orientation. Looking at FIG. 3, the left side of each O-ring is more compressed than the right side, so that the O-ring seeks to slightly pivot the guiding bodies until the wire guiding liner extends in a straight orientation. Finally, the O-ring 30 forms a seal between adjacent guiding bodies 10 such that no dirt etc. can enter into the guiding channel 22 from the free space between adjacent guiding bodies necessary for the pivoting movement of the guiding bodies with respect to each other.

Figure 1:
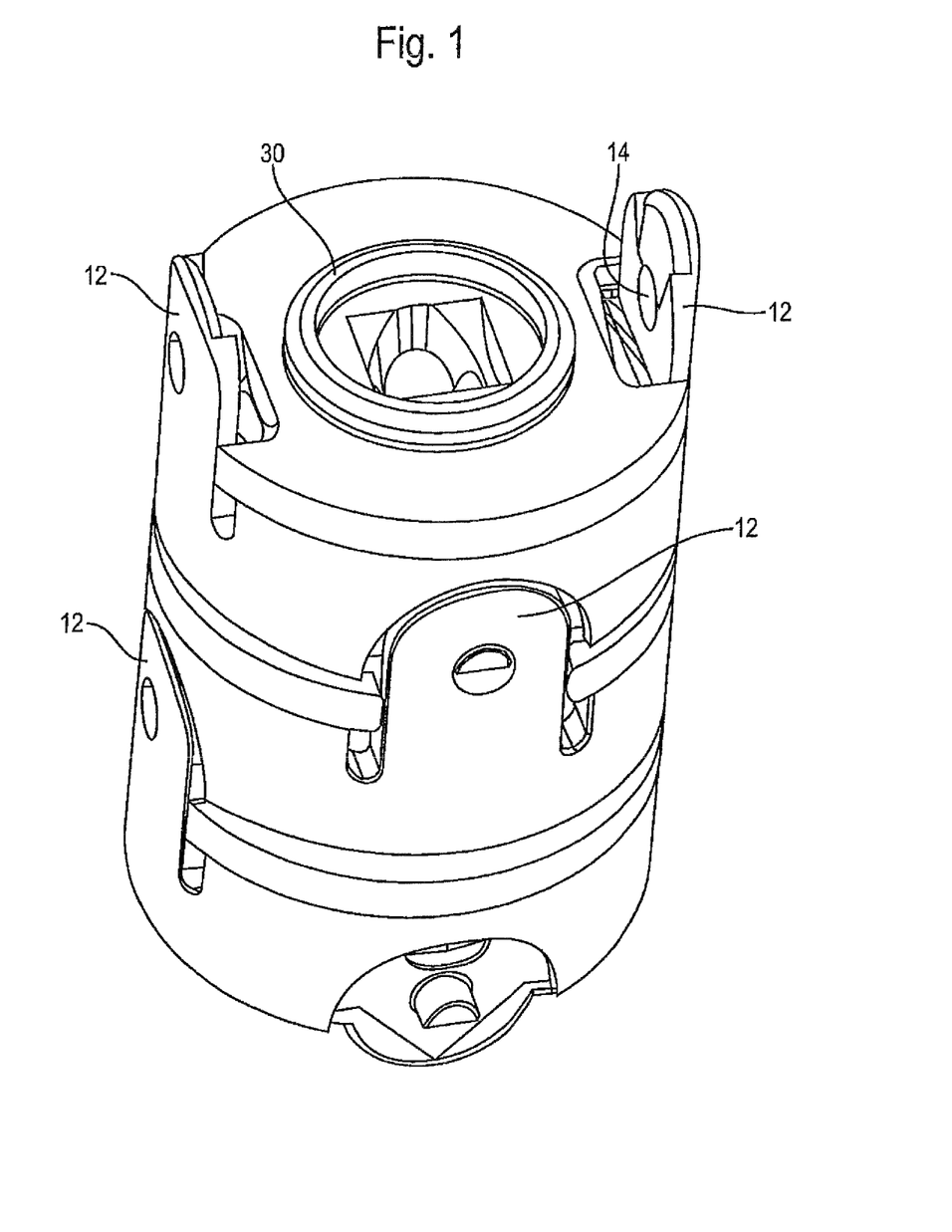
FIG. 1 shows a perspective view of three guiding bodies forming a wire guiding liner according to a first embodiment.
Figure 2:
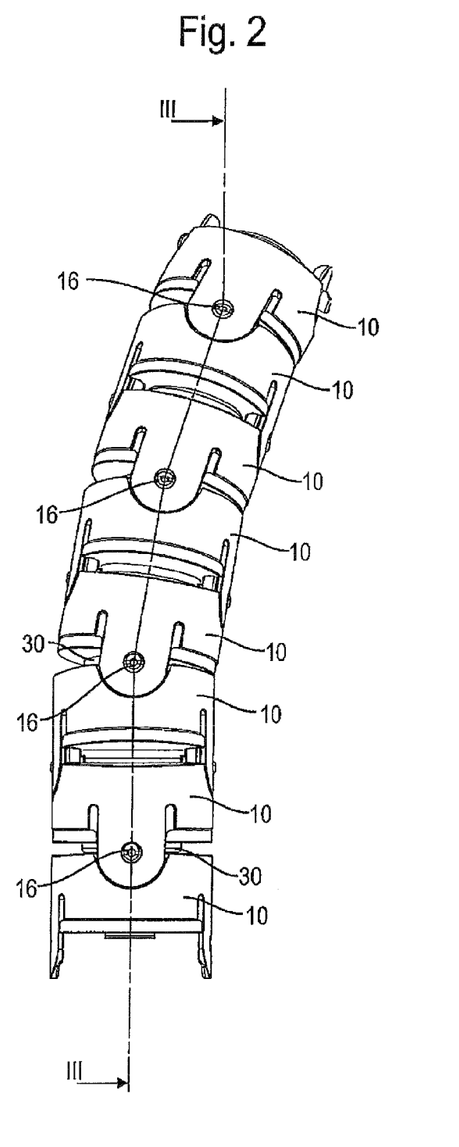
FIG. 2 shows a perspective view of the wire guiding liner according to the first embodiment.
Figure 3:
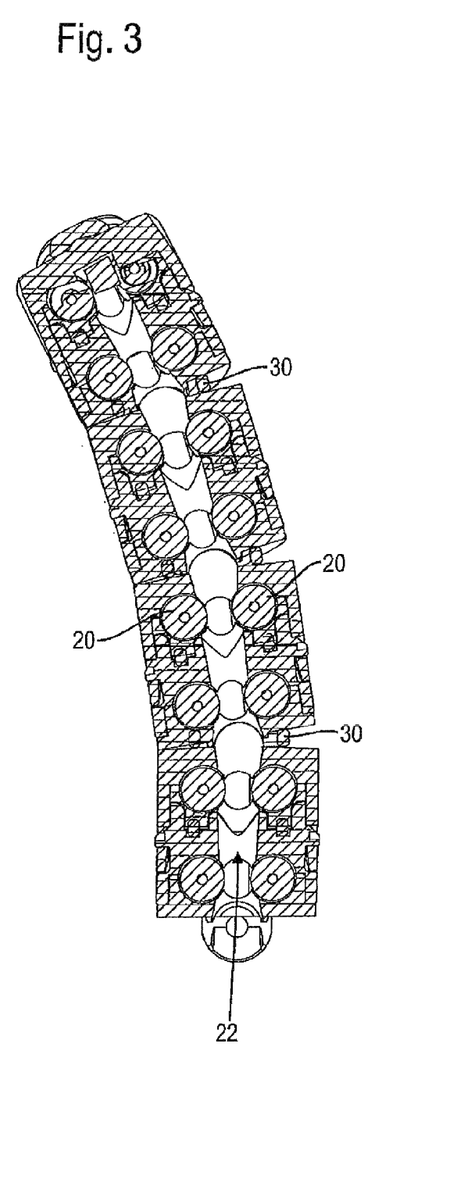
FIG. 3 shows a cross section along line III of FIG. 2.
Figure 4:
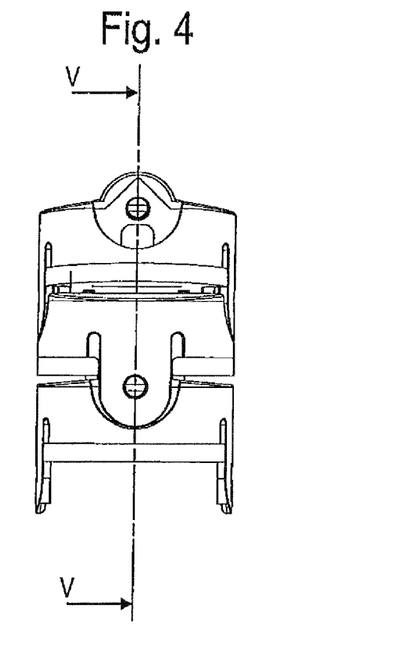
FIG. 4 shows the guiding bodies of FIG. 1 in a side view.
Figure 5:
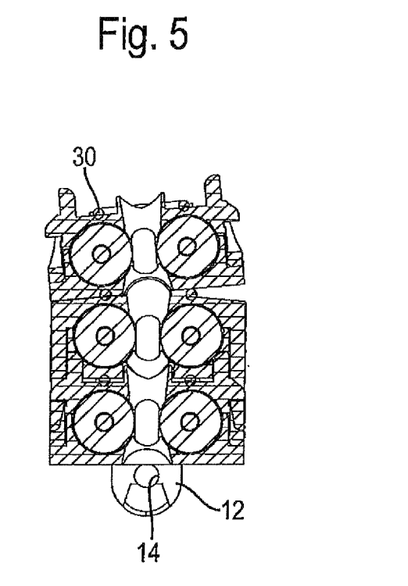
FIG. 5 shows a section along line V of FIG. 4.
Figure 6:
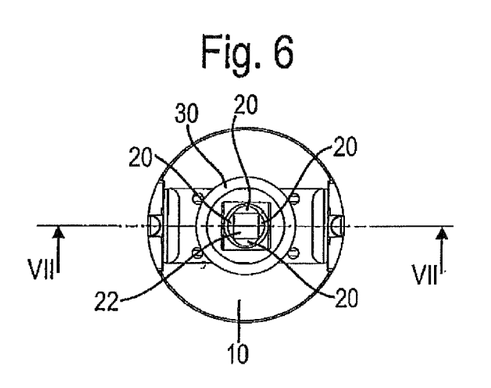
FIG. 6 shows a top view of a guiding body of the liner according to the first embodiment.
Figure 7:
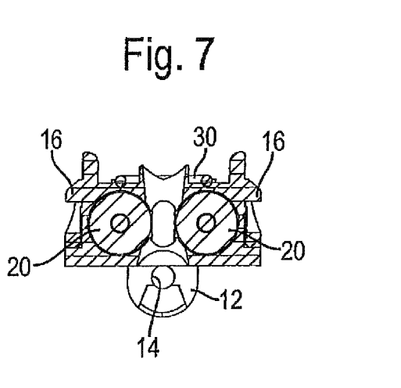
FIG. 7 shows a cross section along line VII of FIG. 6.
Figure 8:
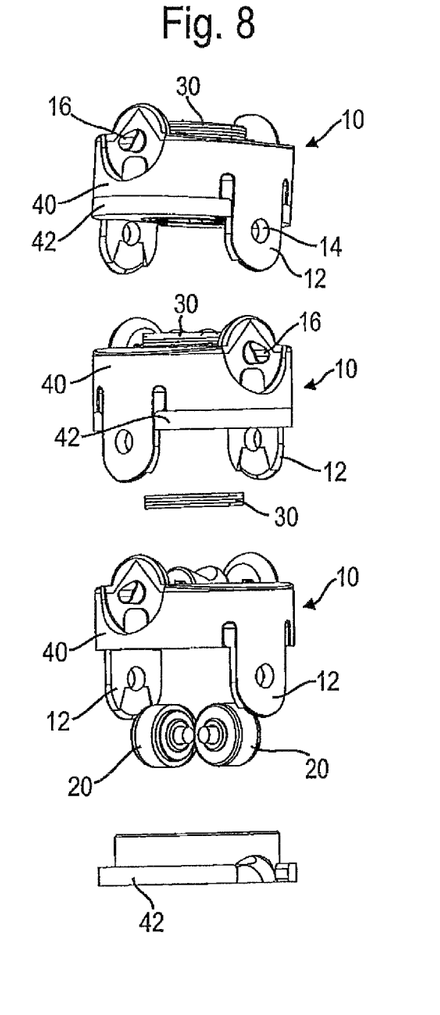
FIG. 8 shows a wire guiding liner according to a second embodiment in a perspective exploded view.
Figure 9:
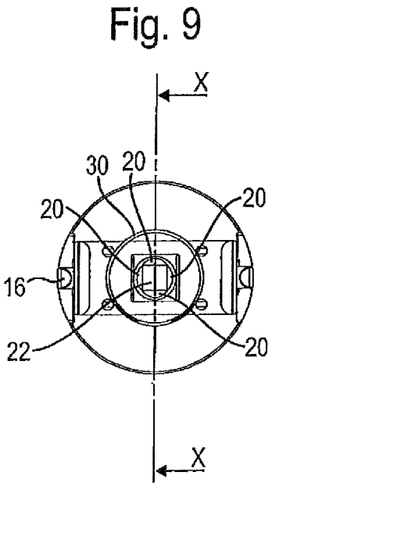
FIG. 9 shows a top view of the liner according to the second embodiment.
Figure 10:
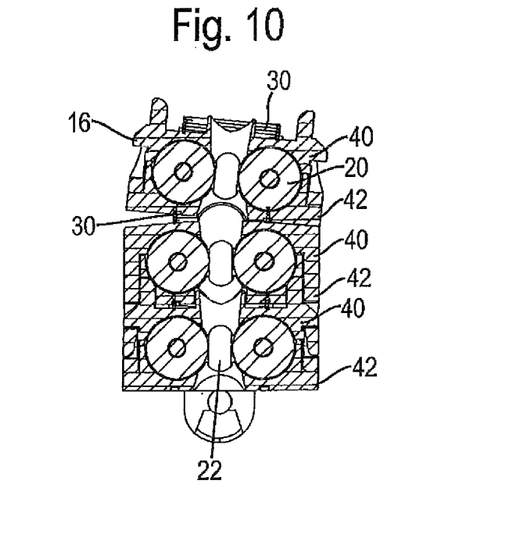
FIG. 10 shows a cross section along line X of FIG. 9.
Figure 11:
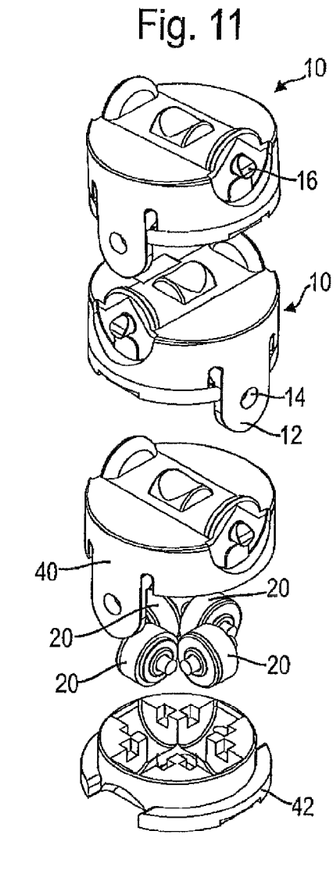
FIG. 11 shows a wire guiding liner according to a third embodiment in an exploded perspective view.
Figure 12:
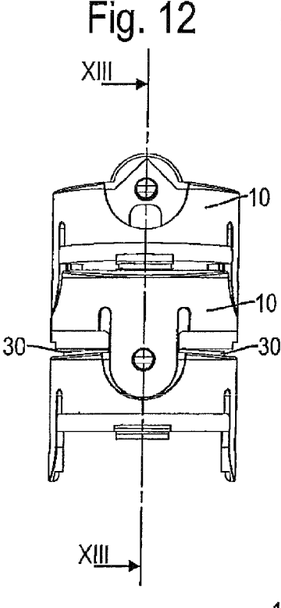
FIG. 12 shows a side view of the liner according to the third embodiment.
Figure 13:
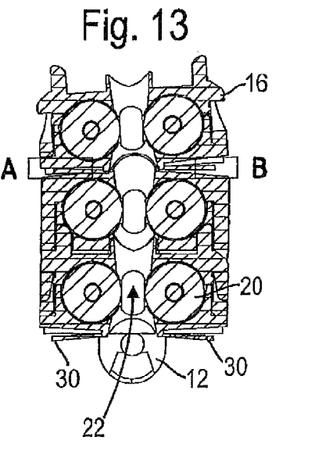
FIG. 13 shows a cross section along line XIII of FIG. 12.
Figure 14:
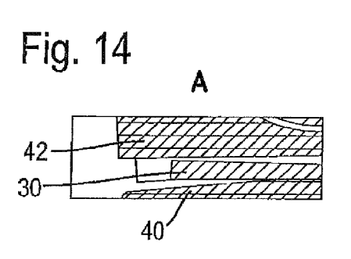
FIG. 14 shows in an enlarged view detail A of FIG. 13.
Figure 15:
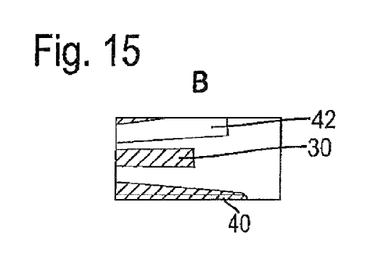
FIG. 15 shows in an enlarged view detail B of FIG. 13.
Figure 16:
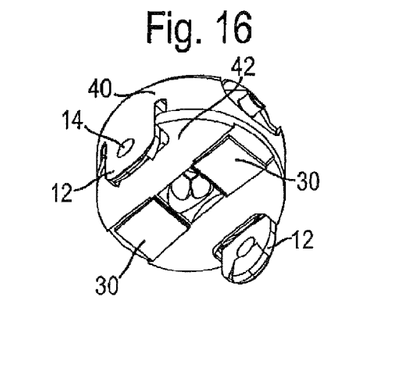
FIG. 16 shows a bottom view of a guiding body used in the wire guiding liner according to the third embodiment.

FIGS. 8 to 10 show a second embodiment of the wire guiding liner. Biasing means 30 is here formed as a spiral spring accommodated on both sides in the respective surfaces of adjacent guiding bodies 10. Spiral spring 30 exerts a pushing force on adjacent guiding bodies 10, tending to space them apart and thereby achieving the same effect as the O-ring 30 used in the first embodiment.

As can be seen in FIG. 8, each guiding body 10 is formed from a body part 40 and a cover part 42. The cover part 42 is arranged between the connecting lugs 12 of the body part 40 and serves to hold rolls 20 within the respective guiding body 10.

A third embodiment of the wire guiding liner is shown in FIGS. 11 to 16. Unlike the first and second embodiments, in which the biasing means is formed as a separate part mounted between adjacent guiding bodies, the third embodiment uses a biasing means which is formed integrally with the respective guiding body 10. The biasing means is here embodied by two leaf springs 30 arranged diametrically opposite each other at cover part 42. As can be seen in particular in FIG. 13, the leaf springs 30 extend from their inner end, where they are integrally connected to cover part 42, obliquely outwardly so as to be spaced with their free outer end from cover part 42. The leaf springs 30 are elastically bendable so as to exert a biasing force onto the adjacent guiding body, seeking to keep the adjacent guiding body level.

The guiding bodies 10 are preferably formed from a plastic material. This allows to mold them, with the biasing means according to the third embodiment being formed integrally during the molding process. In alternative embodiments, the biasing means can be formed from a material which is different from the material forming the guiding bodies. By using a two-step molding process, a biasing means comparable to the O-ring used in the first embodiment can be integrally formed on the guiding bodies, the material used for the biasing means being elastically deformable while the material used for forming the guiding bodies is comparatively rigid.

The invention claimed is:

1. A welding wire guiding liner, having a plurality of guiding bodies which are pivotable with respect to each other around a defined pivot axis, wherein a biasing device concentric with a central axis of the liner is provided which acts between adjacent guiding bodies so as to push them apart, the biasing device being an elastomeric or rubber ring.

2. The wire guiding liner of claim 1, wherein the biasing device is formed as a separate part attached to the respective guiding body.

3. The wire guiding liner of claim 1, wherein the biasing device is formed from a material which is different from the material of the guiding bodies, the biasing device being molded to the respective guiding body.

4. The wire guiding liner of claim 1, wherein the guiding bodies are molded from a plastic material.

5. The wire guiding liner of claim 1, wherein each guiding body comprises four rolls defining a guiding channel for the wire.

6. The wire guiding liner of claim 5, wherein adjacent rolls overlap each other.

7. The wire guiding liner of claim 1, wherein each guiding body has a body part and a cover part resting on the body part, and rolls held between the body part and the cover part.

8. The wire guiding liner of claim 1, wherein each guiding body comprises four rolls defining a guiding channel for the wire.

9. The wire guiding liner of claim 8, wherein adjacent rolls overlap each other.

10. The wire guiding liner of claim 1, wherein each guiding body has a body part and a cover part resting on the body part, and rolls held between the body part and the cover part.

11. The wire guiding liner of claim 2, wherein each guiding body comprises four rolls defining a guiding channel for the wire.

12. The wire guiding liner of claim 11, wherein adjacent rolls overlap each other.

13. The wire guiding liner of claim 2, wherein each guiding body has a body part and a cover part resting on the body part, and rolls held between the body part and the cover part.

14. The wire guiding liner of claim 3, wherein each guiding body comprises four rolls defining a guiding channel for the wire.

15. The wire guiding liner of claim 14, wherein adjacent rolls overlap each other.

16. The wire guiding liner of claim 3, wherein each guiding body has a body part and a cover part resting on the body part, and rolls held between the body part and the cover part.

17. The wire guiding liner of claim 4, wherein each guiding body comprises four rolls defining a guiding channel for the wire.

18. The wire guiding liner of claim 17, wherein adjacent rolls overlap each other.

19. The wire guiding liner of claim 4, wherein each guiding body has a body part and a cover part resting on the body part, and rolls held between the body part and the cover part.

* * * * *